UNITED STATES PATENT OFFICE.

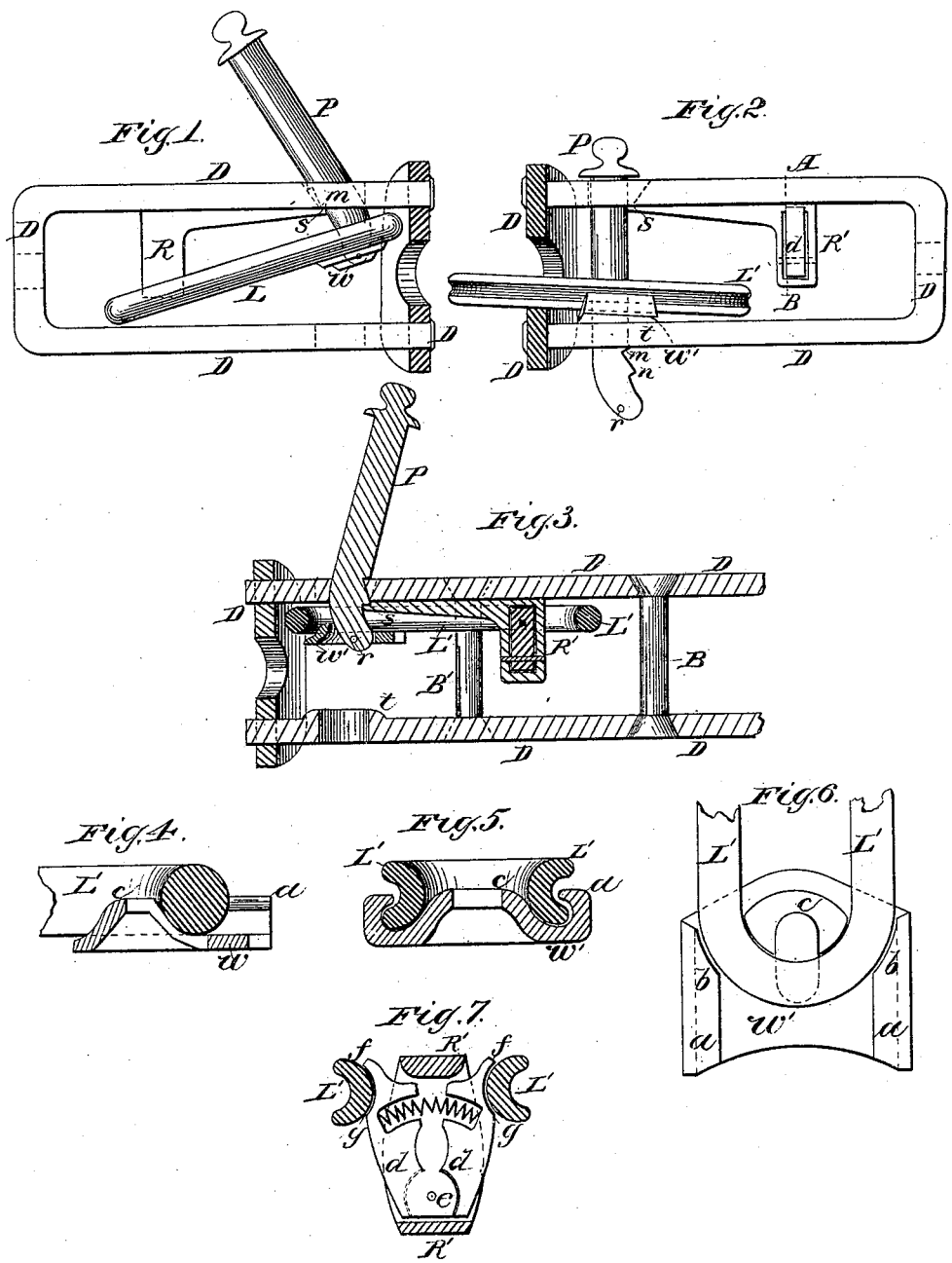

CHARLES L. HORACK, OF BROOKLYN, NEW YORK.

CAR-COUPLING.

SPECIFICATION forming part of Letters Patent No. 253,050, dated January 31, 1882.

Application filed December 1, 1881. (No model.)

*To all whom it may concern:*

Be it known that I, CHAS. L. HORACK, of Brooklyn, in the county of Kings and State of New York, have invented a new and useful Improvement in Car-Couplings, of which the following is a specification.

The objects of my invention are to modify and improve a car-coupling for which Letters Patent No. 154,950 were issued to me September 15, 1874, by providing better means for holding the stationary link in a position, when not required for coupling purposes, where it cannot interfere with another link which may be introduced into the draw-bar to effect a coupling, and where it may be entirely inside of and protected by the draw-bars. To accomplish this I arrange the draw-bar in such a manner that the link connected with the opposite car, after it has entered my draw-bar, serves to keep the stationary link confined in a position from which it can neither slide forward nor sidewise. The pin, washer, and stationary link being always connected, the combined weight of the same has a tendency to carry the pin downward after it has been raised to allow the link connected with the opposite draw-head to enter for coupling purposes. To prevent said stationary pin from dropping down I have provided it with notches, and have arranged suitable seats or supports for said notches, and have given the upper pin-hole such a shape as to make it feasible to maintain the pin in an elevated and reclining position until the two draw-bars meet, and it is made to drop down in order to effect a coupling.

In the further description of the device I refer to the accompanying drawings, forming part of this specification, similar letters of reference indicating corresponding parts.

Figure 1 is a side view of a draw-head, showing the pin in an elevated position ready for coupling. The link L appears in a position through which it would have to pass before assuming that shown in Fig. 3. The link and washer shown in Fig. 1 are of the same general construction as presented in the drawings forming part of my patent of September 15, 1874. Fig. 2 shows a side view of the draw-bar, indicating the position of the fast link, pin, and washer in which the same would be in case and at the time that the fast link was to be used to effect a coupling with another draw-bar. In Figs. 1 and 2 the face-plate appears in a sectional view. Fig. 3 is a vertical section through the center of the draw-bar, the link being held in a position parallel with and close to the upper side of the draw-bar, and the pin being placed in an elevated and slightly-reclining position, ready to effect a coupling with a link connected with another draw-head. The details of the link L' and washer W', as shown in Figs. 2 and 3, are peculiar. They are represented on a larger scale in Figs. 4, 5, and 6. Fig. 4 is a longitudinal section of the washer W' and the end of the link L'. Fig. 5 is a cross-section of said washer W' and the link L'. Fig. 6 is a top view of said washer W' and the end of said link L'. Fig. 7 is a section, A B, through the vertical standard R, as shown in Fig. 2.

The coupling-pin used may either have a round or an oblong section. The details of the washer W' and link L', as shown in Figs. 2, 3, 4, 5, and 6, however, are arranged with a view to using a flat link with them, the greater sectional dimension of said pin being placed, as usual, in the direction of the strain produced by the motive power. The link, pin, and washer being connected with the draw-bar in a manner substantially as described in my Patent No. 154,950, I now construct said draw-bar so as to allow the complete sliding back in it of the stationary link, so that the latter may assume positions as shown in Figs. 1 and 3.

While the drawings show a draw-bar of the same general construction as commonly used at present, where the same is made of wrought-iron, I do not intend to limit myself in regard to the material to be used. The sides of the draw-bar need not necessarily be open, as shown in the drawings, but may be closed, as is done almost always where they are constructed of cast-iron.

A vertical standard, R, is fastened to the upper part and inside of the draw-bar D, back of the pin-holes, and at such a distance from the mouth of the draw-head or draw-bar that when the rear end of the stationary link has been brought back of and near to the rear side of said standard the front end of said link is then confined between the pin and the mouth of the draw-bar, as shown in Figs. 1 and 3. The space left between the standard R and the lower part of the draw-bar, which the rear end of the link has to pass in order to assume the position shown in Fig. 1, or subsequently that shown in Fig. 3, must be somewhat greater than the vertical thickness of the rear end of the link, but less than twice said thickness, as otherwise there would be danger of the fast link sliding forward again and out of the drawhead, or the rear end sliding sidewise, even after a second link had been introduced for coupling purposes, while with this space proportioned as indicated the second link introduced in the draw-bar would serve to confine the rear end of the stationary link back of said standard R. To further insure this the lower part of the draw-bar, above and around the lower pin-hole, might be thickened, as indicated by $t$ in Figs. 2 and 3, as this would have a tendency to hold up the end of the second link, which again would contribute toward preventing the rear end of the stationary link from leaving its position behind the standards R R'. By thus confining the stationary link in a position where it cannot interfere with a second link, I do away with the necessity of having the cheeks C C', described in my Patent No. 154,950.

When a coupling is to be effected by means of a link connected with another draw-bar the stationary link L must first be placed entirely inside of the draw-bar and the stationary pin elevated as shown in Fig. 1. To maintain the pin in said position I have provided it with a notch, $m$, intended to rest on the seat S, which I place and attach below the rear part of and close to the upper pin hole. In the accompanying drawings said seat S is shown to be a part of an angular piece, of which the standard R forms another part. While this might be the easiest way to construct and attach the standard R and the seat S to the draw-bar, said R and S might be constructed and attached as separate parts.

Assuming that a coupling was to be effected between the two draw-heads represented in Figs. 1 and 2, it will readily be seen that the entering link will be apt to strike the link shown in Fig. 1, and thereby to cause the elevated forward end of the same, and with it the washer W and pin P, to drop down, thereby effecting a coupling; but even if the two links should not meet, the jar caused by the two draw-heads striking each other would cause the pin to drop and to pass through the entering links.

It might be well to provide a vertical connection in the shape of a post or bolt, B, riveted or otherwise fastened to the upper and the lower part of the draw-bar or some other similar device a few inches back of the vertical standard R, as shown in Fig. 3, particularly where the sides of said draw-bar are left open, to guard against any possible danger of its spreading vertically or otherwise changing its form. Otherwise, if the forward part of the draw-bar were wide enough, such connecting bolts or posts might be placed in that part of the draw-bar which lies between the face-plate and the standard R, care being, however, taken not to obstruct thereby the sliding back of the stationary link to the position shown in Fig. 1. B' in Fig. 3 represents a post or standard so situated.

As the upper pin-hole has to be extended backward somewhat in order to allow the coupling pin to assume a reclining position when elevated, as shown in Fig. 1, the head of said pin P, or at least the rear part of the same, ought to be made large enough to cover said rear elongation of the upper pin-hole, in order to keep out dirt, snow, &c., after the pin has dropped down from its elevated position.

When the washer W is constructed round and with a cross-section, as shown in my Patent No. 154,950, it is necessary to make its outside diameter rather large, as otherwise it might happen that first one side and then the other of the stationary link would pass below the outer rim of said washer, and thereby the link free itself and become detachable from the coupling-pin. I overcome this difficulty, and besides keep the stationary washer closely attached to the link, by the arrangement of the same as shown in Figs. 2, 3, 4, 5, and 6. By using a flat coupling-pin with them and making the hole in the washer correspond approximately with the shape of the cross-section of said pin, I also cause the stationary link, when being moved backward inside of the drawbar, to move in a direction nearly parallel with the same and prevent its rear end from swinging outside of said draw-bar. The stationary link L' is provided with longitudinal grooves along the outside of its longitudinal parts, and the washer W' is provided with lips $a\ a$, loosely fitting the same, and so arranged that the two cannot be separated after the coupling-pin has passed through the pin-hole in the washer.

Around the front part of the pin-hole in the washer it may be necessary to raise a part of the body of said washer, as indicated by C in Figs. 1, 2, and 3, in order to get sufficient space below for receiving and protecting the ends of the rivet near the lower part of the pin when the latter is placed in either of the positions shown in Figs. 1 and 3. As this raised part C would make it impossible to slide the link over it in order to place it between the lips $a\ a$, it is necessary to cut said lips, as indicated by letters $b\ b$ in Fig. 6, so as to have their forward outline approximately fit the rear end of the link, thereby allowing said link L' to be dropped into the position shown in Figs. 4 and 6, after which it can be slid back and the pin can be passed through the washer.

It will be noticed that the rear part of the link L', after it has been dropped into the position shown in Figs. 4 and 6, partly obstructs the pin-hole in the washer. I thereby prevent link and washer from separating after the coupling-pin has once been inserted.

In Figs. 2 and 3, and on a larger scale in Fig. 7, the standard R' is shown to contain two lugs, d d, hinged near the foot of said standard, and so arranged as to swing some distance outside of the same. Said lugs are to be used when it is desired to hold the link in the positions shown in Figs. 3 and 7. Either their own weight or a spring forcing them outward, as shown in Fig. 7, or both combined, may be used to prevent the rear end of said link from sliding downward. It would be preferable to make the upper parts of said lugs correspond in shape with that part of the link with which they would be in contact while maintaining it in its elevated position, as shown at g g in Fig. 7. The little projections f f at the extreme upper ends of said lugs serve to prevent the latter from passing entirely within the body of said standard R. To prevent the lugs from swinging outward too far, I have provided their lower ends with suitable shoulders fitting against the lower part of the inside of the standard R'.

In Figs. 2 and 3, where the standard R' is shown to be provided with lugs, as described above, two notches appear in the lower part of the coupling-pin. The upper one corresponds with that shown in Fig. 1, while the lower one is to rest on the seat S when the link is in the position shown in Fig. 3. It could, however, be arranged to make one notch answer to maintain the coupling-pin in an elevated position, whether the stationary link be in a position as shown in Fig. 1 or in that shown in Fig. 3, by resting said notch in the former case on the seat S and in the latter on the rear part of the upper rim of the upper pin-hole.

I claim as my invention and wish to secure by Letters Patent—

1. The combination of a link and pin with a draw-bar, D, the latter containing a standard, R, for the purpose of confining one end of said link within the draw-bar, the other being held there by means of the coupling-pin.

2. The combination of a stationary link, pin, and washer with a draw-bar, the latter being provided with a seat, S, below the upper pin-hole for supporting the pin, substantially as specified.

3. The combination of a link and pin and washer attached to the draw-bar D, the latter containing a standard, R, constructed as the vertical arm of an angular piece, the horizontal arm forming a seat for the coupling-pin, substantially as specified.

4. The combination of a stationary link, pin, and washer with a draw-bar, the latter containing a vertical standard back of the pin-holes and attached to the upper part of the draw-bar, for the purpose of confining the rear end of the stationary link when not required for coupling purposes.

5. The combination of a stationary link, pin, and washer with a draw-bar, said link being constructed with longitudinal grooves on its sides, and the washer with lips corresponding with said grooves, substantially as specified.

6. The combination of a stationary link and pin with the draw-bar D, said draw-bar being provided with the rear standard, R', constructed with lugs swinging outward, so as to hold the rear end of said stationary link in an elevated position when not required for coupling purposes.

7. The combination of a stationary link and pin with the draw-bar D, said draw-bar D being provided with the standard R', constructed with lugs forced outward by means of a spring, for the purpose of confining one end of the stationary link when not required for coupling purposes.

CHAS. L. HORACK.

Witnesses:
WALDORF H. PHILLIPS,
CHAS. J. SUMMERSON.